US012707512B2

(12) United States Patent
Dong

(10) Patent No.: US 12,707,512 B2
(45) Date of Patent: Aug. 11, 2026

(54) COMMUNICATION METHOD AND COMMUNICATION DEVICE FOR MULTI-LINK COMMUNICATION PERFORMED BY AN ORIGINATOR DEVICE INITIATING A SESSION

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 358 days.

(21) Appl. No.: 18/273,022

(22) PCT Filed: Jan. 18, 2021

(86) PCT No.: PCT/CN2021/072549
§ 371 (c)(1),
(2) Date: Jul. 18, 2023

(87) PCT Pub. No.: WO2022/151487
PCT Pub. Date: Jul. 21, 2022

(65) Prior Publication Data

US 2024/0324035 A1 Sep. 26, 2024

(51) Int. Cl.
*H04W 76/11* (2018.01)
*H04W 88/06* (2009.01)

(52) U.S. Cl.
CPC ............ *H04W 76/11* (2018.02); *H04W 88/06* (2013.01)

(58) Field of Classification Search
CPC ... H04W 76/00; H04W 76/11; H04W 72/535; H04W 52/0206
USPC ........................................................ 370/329
See application file for complete search history.

(56) References Cited

U.S. PATENT DOCUMENTS

| | | | |
|---|---|---|---|
| 10,827,519 B2 | 11/2020 | Seok et al. | |
| 10,917,924 B2 | 2/2021 | Gan et al. | |
| 11,777,656 B2 * | 10/2023 | Wang | H04L 47/34 370/329 |

(Continued)

FOREIGN PATENT DOCUMENTS

| | | |
|---|---|---|
| CN | 106506125 A | 3/2017 |
| CN | 107637129 A | 1/2018 |

(Continued)

OTHER PUBLICATIONS

"IEEE Standard for Local and metropolitan area networks Part 16: Air Interface for Broadband Wireless Access Systems Amendment 1: Multihop Relay Specification," in IEEE Std 802.16j-2009 (Amendment to IEEE Std 802.16-2009) , vol. No. pp. 1-290, Jun. 12, 2009, doi: 10.1109/IEEESTD.2009.5167148 (Year: 2009).*

(Continued)

*Primary Examiner* — William D Cumming
(74) *Attorney, Agent, or Firm* — Arch & Lake LLP

(57) ABSTRACT

A communication method is provided. In the method, an originator device initiating a session determines a first message frame in any link of a plurality of links and transmits the first message frame to a recipient device responding to the session. The recipient device receives the first message frame in any link of a plurality of links from the originator device and deletes, based on the first message frame, a setup session. The first message frame includes information indicating at least one traffic identifier TID.

6 Claims, 2 Drawing Sheets

(56) References Cited

U.S. PATENT DOCUMENTS

| | | | | |
|---|---|---|---|---|
| 12,237,923 | B2 * | 2/2025 | Wang | H04L 47/34 |
| 2016/0302229 | A1 | 10/2016 | Hedayat | |
| 2017/0055300 | A1 | 2/2017 | Pitchaiah | |
| 2017/0201905 | A1 | 7/2017 | Trainin et al. | |
| 2018/0124858 | A1 | 5/2018 | Gan et al. | |
| 2019/0045537 | A1 | 2/2019 | Seok et al. | |
| 2019/0191353 | A1 * | 6/2019 | Xiong | H04W 76/00 |
| 2019/0335454 | A1 | 10/2019 | Huang et al. | |
| 2021/0211375 | A1 * | 7/2021 | Kwon | H04W 72/535 |
| 2022/0182184 | A1 * | 6/2022 | Wang | H04L 1/1621 |
| 2023/0043522 | A1 * | 2/2023 | Li | H04W 52/0206 |
| 2024/0048276 | A1 * | 2/2024 | Wang | H04L 1/1893 |
| 2024/0324035 | A1 * | 9/2024 | Dong | H04W 76/11 |
| 2025/0096944 | A1 * | 3/2025 | Wang | H04L 1/1621 |

FOREIGN PATENT DOCUMENTS

| | | | | |
|---|---|---|---|---|
| CN | 107852745 | A | 3/2018 | |
| CN | 110999467 | A | 4/2020 | |
| CN | 111066271 | A | 4/2020 | |
| CN | 112074020 | A | 12/2020 | |
| CN | 112188644 | A | 1/2021 | |
| CN | 113543286 | A * | 10/2021 | H04W 76/15 |
| CN | 114340041 | A * | 4/2022 | H04W 76/15 |
| CN | 114340041 | B * | 8/2024 | H04L 5/00 |
| EP | 3493563 | A1 * | 6/2019 | H04W 28/06 |
| EP | 4132118 | A1 * | 2/2023 | H04W 76/15 |
| EP | 4171164 | A1 * | 4/2023 | H04W 72/20 |
| WO | 2021004382 | A1 | 1/2021 | |
| WO | WO-2021208652 | A1 * | 10/2021 | H04W 76/15 |
| WO | WO-2022068602 | A1 * | 4/2022 | H04W 76/15 |

OTHER PUBLICATIONS

International Search Report of PCT/CN2021/072549 dated Sep. 26, 2021 with English translation, (4p).
CNOA issued in Application No. 202180000181.6 dated Jan. 23, 2025 with English translation, (16p).
CNOA issued in Application No. 202180000181.6 dated Jul. 22, 2025 with English translation, (19p).

* cited by examiner

COMMUNICATION METHOD AND COMMUNICATION DEVICE FOR MULTI-LINK COMMUNICATION PERFORMED BY AN ORIGINATOR DEVICE INITIATING A SESSION

CROSS-REFERENCE TO RELATED APPLICATIONS

The present application is a U.S. National Stage of International Application No. PCT/CN2021/072549 filed on Jan. 18, 2021, the disclosure of which are is incorporated herein by reference in its entirety for all purposes.

BACKGROUND

The study of current Wi-Fi technology focuses on 320 MHz bandwidth transmission, aggregation and coordination of a plurality of frequency bands, or the like, which is expected to increase a speed and throughput by at least four times compared to the existing standard, and is mainly applied to the scenarios such as video transmission, augmented reality (AR), virtual reality (VR) or the like.

The aggregation and coordination of a plurality of frequency bands means that devices communicate with each other simultaneously in frequency bands such as 2.4 GHz, 5 GHz, 6 GHz or the like, for which new media access control (MAC) mechanism needs to be defined for managing. In addition, it is expected that the aggregation and coordination of a plurality of frequency bands can support low latency transmission.

In current technology of the aggregation and coordination of a plurality of frequency bands, the maximum bandwidth supported is 320 MHz (160 MHz+160 MHz), and 240 MHz (160 MHz+80 MHz) and other bandwidths may also be supported.

In current technology, a station (STA) and access point (AP) may be a multi-link device (MLD), i.e., a device supporting simultaneous transmitting and/or receiving function in a plurality of links at a same time point. Thus, in current technology, there may be a plurality of links between the STA and the AP, and it is studying the communication in a plurality of links between such two devices.

In addition, in current technology, a session may be set up for data transmission by using a block ack (BA) mechanism, and it starts to study an ack mechanism for a plurality of traffic identifiers (TIDs).

SUMMARY

The present disclosure relates to the field of communications, and in particular, to a multilink communication method, device, and program stored on a storage medium. An example of the present disclosure provides a multi-link communication method, including: determining a first message frame in any link of a plurality of links, wherein the first message frame includes first information indicating at least one traffic identifier TID; and transmitting the first message frame.

An example of the present disclosure provides a communication method in a plurality of links, including: receiving a first message frame in any link of a plurality of links, wherein the first message frame includes first information indicating at least one traffic identifier TID; and deleting, based on the first message frame, a setup session.

An example of the present disclosure provides a multi-link communication device, including: a processing module, configured to determine a first message frame in any link of a plurality of links, wherein the first message frame includes first information indicating at least one traffic identifier TID; and a transceiver module, configured to transmit the first message frame.

An example of the present disclosure provides a multi-link communication device, including: a transceiver module, configured to receive a first message frame, wherein the first message frame includes first information indicating at least one traffic identifier TID; and a processing module, configured to delete, based on the first message frame, a setup session.

An example of the present disclosure provides a communication device including a memory, a processor and a computer program stored on the memory and runnable on the processor. The processor, when executing the computer program, implements the method described above.

An example of the present disclosure provides a computer readable storage medium having a computer program stored thereon that, when being executed by a processor, implements the method described above.

BRIEF DESCRIPTION OF THE DRAWINGS

These and other features of examples of the present disclosure will become more apparent by describing in detail examples of the present disclosure with reference to the accompanying drawings, in which.

DETAILED DESCRIPTION

The following description, with reference to the accompanying drawings, is provided for a full understanding of various examples of the present disclosure as defined by the appended claims and their equivalents. Various examples of the present disclosure include various specific details, which however are considered to be exemplary only. In addition, descriptions of well-known techniques, functions and constructions may be omitted for the sake of clarity and brevity.

Terms and phrases used in the present disclosure are not limited to their written meaning, but are used only by the inventor to enable a clear and consistent understanding of the present disclosure. Accordingly, to those skilled in the art, the descriptions of various examples of the present disclosure are provided for illustrative purposes only and are not intended to be limiting.

It should be understood that, unless the context clearly indicates otherwise, the singular forms "an", "a", "said" and "the" as used herein may also include the plural forms. It should be further understood that the word "include/comprise" as used in the present disclosure refers to the presence of the described features, integers, steps, operations, elements and/or components, but does not exclude the presence or addition of one or more other features, integers, steps, operations, elements, components and/or groups thereof.

It will be understood that although the terms "first", "second", and the like may be used herein to describe various elements, these elements should not be limited by these terms. These terms are only used to distinguish one element from another. Thus, without departing from the teachings of the examples, a first element discussed below may be referred to as a second element.

It should be understood that when an element is referred to as being "connected" or "coupled" to another element, it may be directly connected or coupled to said another element, or there may be an intermediate element therebetween. In addition, "connected" or "coupled" as used herein may refer to being wirelessly connected or wirelessly coupled. The term "and/or" or the expression "at least one of . . . " as used herein includes any and all combinations of one or more of the relevant listed items.

Unless otherwise defined, all terms used herein, including technical and scientific terms, have the same meaning as generally understood by those skilled in the art to which the present disclosure belongs.

Examples of the present disclosure will be described in detail below in connection with the accompanying drawings.

Figure 1:
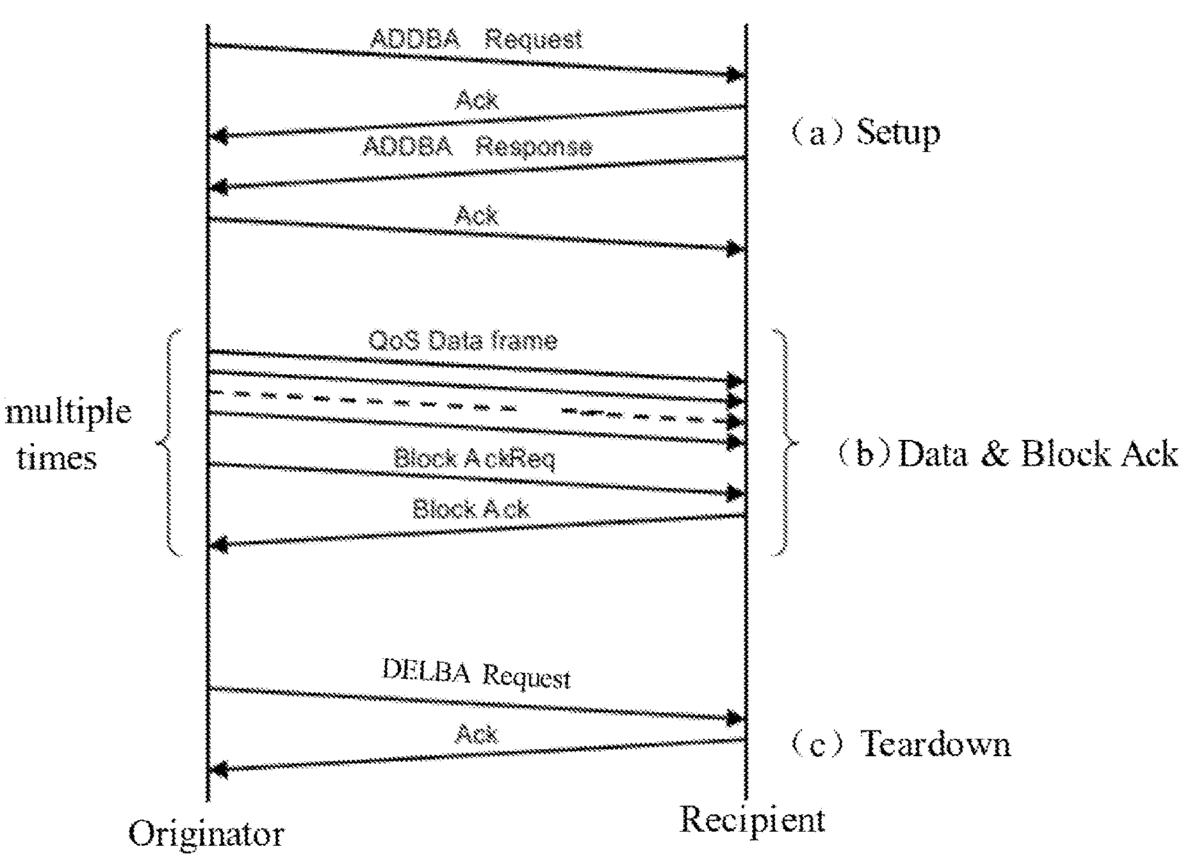
FIG. 1 is a schematic diagram illustrating a BA mechanism according to an example of the present disclosure.

FIG. 1 is a schematic diagram illustrating an example of a block ack (BA) mechanism according to an example.

Referring to FIG. 1, in a Setup phase (a), an originator/initiator and a recipient initiate a session through a handshake of an add block ack (ADDBA) request frame and an ADDBA response frame. Both the ADDBA request frame and the ADDBA response frame may be management frames and may be in the form of action frames. The management frames (the ADDBA request frames and ADDBA response frames) need to be acknowledged by an ack (acknowledgment). As shown in FIG. 1, the session is set up by the originator sending the ADDBA request frame to the recipient, the recipient returning an ack frame indicating the receipt of the ADDBA request frame, and then the recipient sending the ADDBA response frame to the ADDBA request frame, and the originator returning an ack frame indicating the receipt of the ADDBA response frame.

In the setup phase (a), the format of the ADDBA request frame sent by the originator to the recipient may be as shown in Table 1 below.

TABLE 1

| Format of ADDBA request frame action field | |
|---|---|
| Order | Information |
| 1 | Category |
| 2 | Block Ack Action |
| 3 | Dialog Token |
| 4 | Block Ack Parameter Set |
| 5 | Block Ack Timeout Value |
| 6 | Block Ack Starting Sequence Control |
| 7 | GCR Group Address element (optional) |
| 8 | Multi-band (optional) |
| 9 | TCLAS (optional) |
| 10 | ADDBA Extension (optional) |

Referring to Table 1, the ADDBA request frame may include: Category field, Block Ack Action field, Dialog Token field, Block Ack Parameter Set field, Block Ack Timeout Value field, and Block Ack Starting Sequence Control field. In addition, optionally, the ADDBA request frame may also include: Groupcast with Retries (GCR) Group Address Element field, Multi-band field, TCLAS field and ADDBA Extension field.

The Block Ack Parameter Set field of Table 1 may be defined as shown in Table 2 below.

TABLE 2

| Block Ack Parameter Set fixed field | | | |
|---|---|---|---|
| A-MSDU Supported | Block Ack Policy (BA policy) | TID | Buffer Size |
| B0 | B1 | B2 B5 | B6 B15 |
| bits: 1 | 1 | 4 | 10 |

In Table 2, the MSDU may refer to MAC Service Data Unit. The BA policy may be used to define whether the ack is to be returned immediately or delayed. The TID may refer to traffic identifier. The Buffer Size may indicate the number of buffers available for a particular TID. For example, when the A-MSDU Supported field, as indicated by the Block Ack Parameter Set field sent by a station, is equal to 0, the number of bytes, that each buffer can hold, is equal to the maximum value of the MSDU. When the A-MSDU Supported field is equal to 1 as indicated by the station, the number of bytes, that each buffer can hold, is equal to the maximum value of the A-MSDU supported by the station. It is to be understood that although one TID and a corresponding buffer size are illustrated in Table 2, the present disclosure is not limited thereto. There may be a plurality of TIDs and buffer sizes respectively corresponding to the plurality of ITDs, and the number of bits of each of TIDs and buffer sizes may also be changed.

Further referring to FIG. 1, after the session link is set up, in a Data & Block Ack phase (b), e.g., during a transmission opportunity (TXOP), the originator may send a plurality of data frames in succession, e.g., a quality of service (QOS) data frame (i.e., QoS Data frame in FIG. 1), and at the end of the data frame transmission, sends a Block Ack Request (Block Ack Req). The recipient returns a Block Ack (BA) regarding the plurality of data frames.

In the Data & Block Ack phase (b), for a Multi-TID Block AckReq (Multi-TID BAR), the block ack request (BAR) information field may be defined as shown in Table 3 below.

TABLE 3

| BAR information field (Multi-TID Block AckReq) | |
|---|---|
| Octets: 2 | 2 |
| Per TID Info | Block Ack Starting Sequence Control |
| ← Repeat for each TID → | |

In the Data & Block Ack phase (b), for a Multi-TID Block Ack (Multi-TID BA), the block ack (BA) information field may be as shown in Table 4 below.

TABLE 4

| BA information filed (Multi-TID Block Ack) | | |
|---|---|---|
| Octets: 2 | 2 | 2 |
| Per TID Info | Block Ack Starting Sequence Control | Block Ack Bitmap |
| Repeat for each TID | | |

The Per TID Info subfield may be defined as shown in Table 5 below.

TABLE 5

| Per TID Info subfield | | | |
|---|---|---|---|
| Reserved | | TID Value | |
| B0 | B11 | B12 | B15 |
| bits: 12 | | 4 | |

The Block Ack Starting Sequence Control subfield in Tables 1, 3 and 4 may be defined as shown in Table 6 below.

TABLE 6

| Block Ack Starting Sequence Control subfield | |
|---|---|
| Fragment Number (0) | Starting Sequence Number |
| bits: 4 | 12 |

Further referring to FIG. 1, after the Block Ack is completed, the setup session may be tear down (deleted). Specifically, in a Teardown phase (c), the originator may send a deleting BA request frame (DELBA Request) and the recipient then returns an ack frame. The DELBA Request frame for a plurality of TIDs according to an example of the present disclosure will be described in detail later with reference to FIG. 3 and Table 7.

Figure 2:
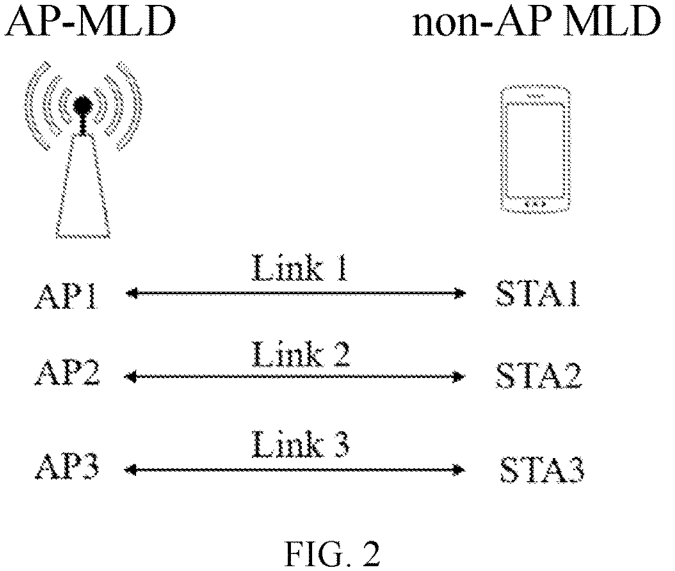
FIG. 2 is a schematic diagram illustrating a multi-link communication scenario according to an example of the present disclosure.

FIG. 2 is a schematic diagram illustrating a multi-link communication scenario according to an example.

In a wireless LAN, a basic service set (BSS) may include an access point and one or more devices (non-AP STAs, which may be referred to herein as "stations") in communication with the AP. One basic service set may be connected to a distribution system (DS) via its AP and then to another basic service set, forming an extended service set (ESS).

The AP is a wireless switch used in a wireless network and is the core of the wireless network. The AP may be used as a wireless base station, and is primarily used as a bridge for connecting a wireless network and a wired network. With such access point AP, the wired network and the wireless network may be integrated.

The AP may include a software application and/or circuitry to enable other types of nodes in the wireless network to communicate with the outside and inside of the wireless network via the AP. In some examples, for example, the AP may be a terminal device or network device equipped with a Wireless Fidelity (Wi-Fi) chip.

As an example, the non-AP STA may include but is not limited to: cellular phone, smart phone, wearable device, computer, personal digital assistant (PDA), personal communication system (PCS) device, personal information manager (PIM), personal navigation device (PND), global positioning system, multimedia device, Internet of Things (IoT) device, and the like.

In an example of the present disclosure, the AP and non-AP STA may be devices that support multi-link communication, and may, for example, be denoted as an AP MLD and a non-AP STA MLD, respectively. For ease of description, in the following, an example of one AP MLD communicating with one non-AP STA MLD in a plurality of links is mainly described, however, the examples of the present disclosure are not limited thereto.

In FIG. 2, by way of example only, the AP MLD may represent an access point that supports multi-link communication, and the non-AP STA MLD may represent a station that supports multi-link communication. Referring to FIG. 2, the AP MLD may operate in three links, such as AP1, AP2 and AP3 as shown in FIG. 2, and the non-AP STA MLD may also operate in three links, such as STA1, STA2 and STA3 as shown in FIG. 2. In the example of FIG. 2, it is assumed that AP1 communicates with STA1 via a corresponding first link Link 1, and similarly, AP2 and AP3 communicate with STA2 and STA3 via a second link Link 2 and a third link Link 3, respectively. Furthermore, Link 1 to Link 3 may be a plurality of links at different frequencies, for example, links at 2.4 GHZ, 5 GHZ, 6 GHz or several links with the same or different bandwidths at 2.4 GHz, 5 GHZ, 6 GHZ. In addition, there may be a plurality of channels in each link. However, it should be understood that the communication scenario shown in FIG. 2 is only exemplary, and the present invention concept is not limited thereto. For example, the AP MLD may be connected to a plurality of non-AP STA MLDs, or in each link, the AP may communicate with a plurality of other stations.

Further, although FIG. 2 shows that the first link Link 1 to the third link Link 3 all belong to the same AP MLD, the examples of the present disclosure are not limited thereto. For example, the first link Link 1 to the third link Link 3 may be links shared by the AP MLD shown in FIG. 2 with other AP MLDs. In addition, the first link Link 1 to the third link Link 3 may connect the AP MLD shown in FIG. 2 to a corresponding STA of the non-AP STA MLD shown in FIG. 2, and may further connect the AP MLD shown in FIG. 2 to a corresponding STA of other non-AP STA MLDs.

Further, although in FIG. 2, the plurality of links between the AP MLD and the non-AP STA MLD are shown as three links, the examples of the present disclosure are not limited thereto, and there may be more or fewer links therebetween.

In conjunction with FIG. 1, a BA-based session link may be set up between the two MLDs. The BA protocol between the two MLDs may be applied to all links to which the TID corresponding to the BA protocol is mapped. According to an example, for an uplink (UL) or downlink (DL), all TIDs may be mapped to all setup links.

In conjunction with FIG. 1, one of the AP MLD and the non-AP STA MLD may act as the originator and the other may act as the recipient. In the Setup phase (a), it may be set up between the originator multi-link device and the recipient multi-link device in any link of a plurality of links. For example, to set up a BA between the two multi-link devices, an accessory device of the originator multi-link device may send an ADDBA request frame in any link, indicating the TID for which the BA is being set up. A corresponding accessory device of the recipient multi-link device may respond with an ADDBA response frame. The corresponding accessory device of the recipient multi-link device may accept or reject the ADDBA request. When the request is accepted, the BA may be set up between the two multi-link devices. In an example, at least one session communication between the originator multi-link device and the recipient multi-link device may be set up in any link of a plurality of links, for example, a session communication under Link 1 may be initiated by using Link 1, and in addition, a session communication under Link2 and/or Link3 may be initiated by using Link 1. In the Data & Block Ack phase (b), data may be transmitted in at least one link, and it may perform, in one link and through the BA frame, the acknowledge of data (e.g., MAC Protocol Data Unit (MPDU)) received in other links. In the Teardown phase (c), at least one session communication may be deleted. As an example, all setup session communications or the BA corresponding to a plurality of TIDs may be deleted in one link. However, the related art does not define the deletion for multi-TID BA mechanism, and if the deletion for a plurality of TIDs is performed according to the deletion mechanism for a single TID in the existing standard procedure, many signaling processes are resulted, which wastes spectrum resources. A method and device for deletion for a plurality of TIDs according to an example of the present disclosure is described in further detail herein.

Figure 3:
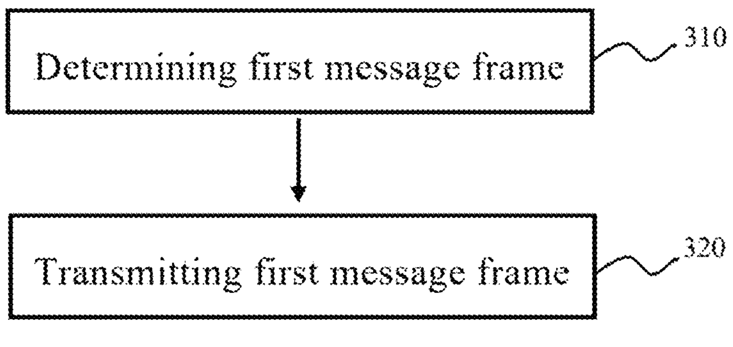
FIG. 3 is a flowchart illustrating a communication method according to an example of the present disclosure.

FIG. 3 is a flowchart illustrating a communication method according to an example of the present disclosure.

The operation in the flowchart of FIG. 3 may be an operation performed at the originator, and correspondingly, the operation in FIG. 3, which will be described below, may be an operation performed at the initiator. For example, the initiator may be one of an AP MLD and non-AP STA MLD and, correspondingly, the recipient may be the other of the AP MLD and non-AP STA MLD.

At step 310, a first message frame may be determined in any link of a plurality of links, wherein the first message frame may include first information indicating at least one traffic identifier (TID). According to an example of the present disclosure, the plurality of links may be a plurality of links in different frequency bands that can be supported by the originator multi-link device. According to an example of the present disclosure, the first message frame may be used to terminate (delete) a session link that has been set up and corresponds to the at least one TID, for example, the first message frame may be a DELBA request frame. Furthermore, the at least one TID may correspond to different upper layer services and QoS requirements, respectively. In an example of the present disclosure, there may be various ways of determining the first message frame, e.g., the originator may generate the first message frame based on at least one of network condition, load condition, hardware capability of transmitting/receiving device, service type, relevant protocol provision, which however is not specifically limited by the examples of the present disclosure. In an example of the present disclosure, the originator may also obtain the first message frame from an external device, which however is not specifically limited in the examples of the present disclosure.

The first information in the first message frame may be a multi-TID DELBA parameter set field, which may be defined as shown in Table 7 below.

TABLE 7

| Definition of First Information | | | | |
|---|---|---|---|---|
| Initiator | MLD address | TID 1 | TID 2 | . . . |

Referring to Table 7, the first information may include at least one traffic identifier, for example, TID 1, TID 2 and the like as shown in Table 7. According to an example of the present disclosure, the TIDs may correspond to different upper layer services and QoS requirements.

In the case where a plurality of TIDs (e.g., two or more TIDs) are included in Table 7, the first information of the first message frame may indicate, for example, terminating (deleting), at a time, the session link that has been set up and corresponds to the plurality of TIDs.

Optionally, the first information may also include a multi-link device address, for example, the MLD address as shown in Table 7. The multi-link device address may be used to identify a connected device in multi-link communication. According to an example of the present disclosure, the multi-link device address corresponds to at least one traffic identifier TID. That is, the plurality of TIDs to be deleted may be the TIDs transmitted by the multi-link device indicated by the multi-link device address.

According to an example of the present disclosure, the multi-link device address may identify an address of an originator device initiating a session, or the multi-link device address may identify an address of a recipient device responding to the session. For example, the multi-link device address may be identified according to the Initiator subfield in Table 7. For example, the value of Initiator may be set to a first value (e.g., "1") to identify that the originator of the BA mechanism setup (the originator in FIG. 1) sends the first message frame (e.g., the DELBA request frame), and the multi-link device address (MLD address) is the MLD address of the originator. The value of Initiator may be set to a second value (e.g., "0") to identify that the responder (the recipient in FIG. 1) of the BA mechanism setup sends the first message frame (e.g., the DELBA request frame), and the MLD address is the MLD address of the responder. More generally, the MLD address is the MLD address of the originator, i.e., the originator of the BA setup (originator in FIG. 1) may be the initiator of the first message frame (e.g., the DELBA request frame).

According to an example of the present disclosure, the first information may not include the multi-link device address (MLD address), in which case the two sides may find the corresponding MLD address based on the TID and the MAC address in each link. According to an example, the two sides may, for example, exchange the MAC addresses in each link with each other via various message frames when setting up an associated link.

Furthermore, it is to be understood that each of the elements shown in Tables 1 to 7 exists independently and that these elements are exemplarily listed in the same table, which however does not mean that all elements in the table must exist simultaneously according to that shown in the table. The value of each of these elements is independent of the value of any other element in Tables 1 to 7. It is therefore understood by those skilled in the art that the value of each element in the tables of the present disclosure is an independent example.

At step 320, the first message frame may be transmitted. According to an example, the first message frame may be transmitted in the link where the first message frame is determined. According to another example, the BA mechanism may be set up in one of the plurality of links, and according to the principle of BA mechanism setup, the BA mechanism set up in that link may be applied in a plurality of links. Therefore, the first message frame (DELBA request frame) may be transmitted in the one of the plurality of links where the BA mechanism is set up (i.e., the link where the session is set up), or may be transmitted in another link of the plurality of links (different from the link where the BA mechanism is set up (i.e., the link where the session is set up)).

According to an example of the present disclosure, if the multi-link device supports enhanced multi-link single-radio (EMLSR), the link used to transmit the first message frame (DELBA request frame) may not be the same as the link used to set up the BA mechanism (i.e., the link used to set up the session).

Figure 4:
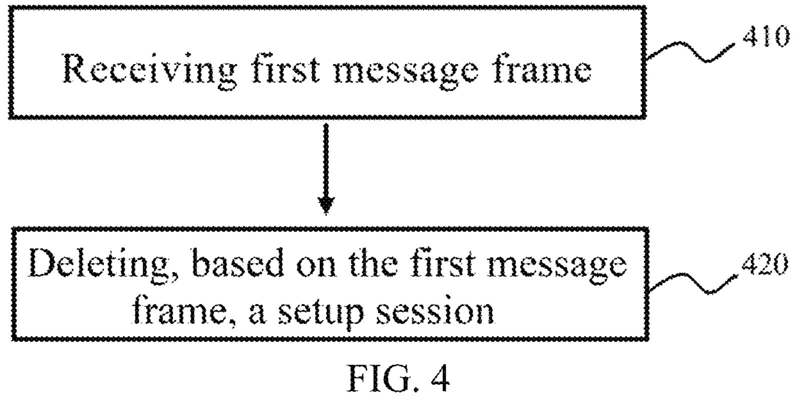
FIG. 4 is a flowchart illustrating another communication method according to an example of the present disclosure.

FIG. 4 is a flowchart illustrating another communication method according to an example of the present disclosure. The operation in the flowchart of FIG. 4 may be an operation performed at the recipient, i.e., an operation corresponding to the operation of the initiator shown in FIG. 3.

Referring to FIG. 4, at step 410, a first message frame is received in any one of a plurality of links, wherein the first message frame may include first information indicating at least one traffic identifier (TID). As described above with reference to Table 7, the first information may include at least one TID, and optionally, may also include a multi-link device address corresponding to the at least one TID. According to an example, the multi-link device address may identify an address of an originator device initiating a session, or the multi-link device address may identify an address of a recipient device responding to the session, which may be identified by the Initiator subfield in Table 7.

At step 420, a setup session may be deleted according to the first message frame. For example, the BA corresponding to at least one TID of the corresponding multi-link device may be deleted according to at least one TID and/or multi-link device address in the first message frame. In an example, the setup of the BA mechanism (as shown in the Setup phase (a) in FIG. 1) may be of single-TID (i.e., the BA is set up for one TID at a time), but the deletion of the BA mechanism may be of multi-TID (i.e., the BA corresponding to a plurality of TIDs is deleted at a time).

Figure 5:
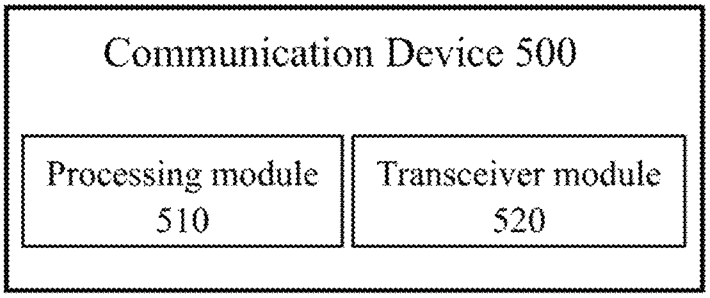
FIG. 5 is a block diagram illustrating a communication device according to an example of the present disclosure.

FIG. 5 is a block diagram illustrating a communication device 500 according to an example of the present disclosure. The communication device 500 may be a device that supports multi-link communication and may include a processing module 510 and a transceiver module 420.

The communication device 500 shown in FIG. 5 may be applied to an initiator. In this case, the processing module 510 may be configured to determine a first message frame in any one of a plurality of links, wherein the first message frame may include first information indicating at least one traffic identifier (TID). The transceiver module 520 may be configured to transmit the first message frame. As described above with reference to Table 7, the first information may include at least one TID, and optionally, may also include a multi-link device address corresponding to the at least one TID. According to an example, the multi-link device address may identify an address of an originator device initiating a session, or the multi-link device address may identify an address of a recipient device responding to the session, which may be identified by the Initiator subfield in Table 7. That is, when the communication device 500 shown in FIG. 5 may be applied to the initiator, the processing module 510 and the transceiver module 520 may perform the operations described with reference to FIG. 3, which are not repeated herein for the sake of brevity.

The communication device 500 shown in FIG. 5 may be applied to a recipient. In this case, the transceiver module 520 may be configured to receive a first message frame, wherein the first message frame includes first information indicating at least one traffic identifier (TID). The processing module 510 may be configured to delete a setup communication according to the first message frame. As described above with reference to Table 7, the first information may include at least one TID, and optionally, may also include a multi-link device address corresponding to the at least one TID. According to an example, the multi-link device address may identify an address of an originator device initiating a session, or the multi-link device address may identify an address of a recipient device responding to the session, which may be identified by the Initiator subfield in Table 7. That is, when the communication device 500 shown in FIG. 5 may be applied to the recipient, the processing module 510 and the transceiver module 520 may perform the operations described with reference to FIG. 4, which are not repeated herein for the sake of brevity.

It is to be understood that the parameter information involved in the communication device of FIG. 5 may be similar to that described in Table 7, which is not repeated herein for the sake of brevity. Furthermore, the communication device 500 shown in FIG. 5 is only exemplary and the examples of the present disclosure are not limited thereto. For example, the communication device 500 may also include other modules, such as a memory module and the like. In addition, the individual modules in the communication device 500 may be combined into a more complex module or may be divided into more separate modules to support various functions.

The communication method according to FIG. 3 and FIG. 4 and the communication device according to FIG. 5 can reduce signaling interactions and improve spectrum efficiency.

Based on the same principle as that of the method provided in the examples of the present disclosure, an example of the present disclosure also provides a communication device including a processor and a memory. Machine readable instructions (which may also be referred to as "computer program") are stored in the memory, and the processor is configured to execute the machine readable instructions to implement the method described with reference to FIG. 3 and/or FIG. 4.

An example of the present disclosure also provides a computer-readable storage medium on which a computer program is stored, and the computer program, when being executed by a processor, implements the method described with reference to FIG. 3 and/or FIG. 4.

The processor may be various exemplary logic boxes, modules and circuits for implementing or executing the content described in conjunction with the present disclosure, for example, CPU (Central Processing Unit), general-purpose processor, DSP (Digital Signal Processor), ASIC (Application Specific Integrated Circuit), FPGA (Field Programmable Gate Array) or other programmable logic devices, transistor logic devices, hardware components, or any combination thereof. The processor may also be a combination that implements a computing function, for example, a combination of one or more microprocessors, a combination of DSP and microprocessor, or the like.

The memory may be, ROM (Read Only Memory), RAM (Random Access Memory), EEPROM (Electrically Erasable Programmable Read Only Memory), CD-ROM (Compact Disc Read Only Memory) or other compact disc storage, optical disc storage (including compact disc, laser disc, CD, digital versatile optical disc, Blu-ray disc and the like), disk storage media or other magnetic storage device, or any other medium capable of carrying or storing program code in the form of instructions or data structures and capable of being accessed by a computer, however the present disclosure is not limited thereto.

It should be understood that although the steps in the flowchart of the accompanying drawings are shown in the order indicated by the arrows, the steps are not necessarily performed in the order indicated by the arrows. Unless expressly stated herein, there is no strict sequential limitation on the execution of these steps, which may be executed in any other order. In addition, at least some of the steps in the flowchart of the accompanying drawings may include a plurality of sub-steps or a plurality of stages which are not necessarily performed or completed at the same moment, but may be performed at different moments, and are not necessarily performed sequentially, but may be performed alternately with other steps or at least some of sub-steps or stages of other steps.

Although the present disclosure has been shown and described with reference to certain examples of the present disclosure, it is to be understood by those skilled in the art that various changes in form and detail may be made without departing from the scope of the present disclosure. Accordingly, the scope of the present disclosure should not be limited to the examples, but should be defined by the appended claims and their equivalents.

What is claimed is:

1. A multi-link communication method, performed by an originator device initiating a session, wherein the originator device is an access point (AP) multi-link device (MLD) or a non-AP station (STA) MLD, comprising:

determining a first message frame in any link of a plurality of links; and transmitting the first message frame to a recipient device responding to the session, wherein the recipient device is; the AP MLD when the originator device is the non-AP STA MLD; and the non-AP STA MLD when the originator device is the AP MLD, wherein the first message frame is configured for the recipient device to delete a session link that has been set up and corresponds to at least one traffic identifier (TID) and comprises first information, wherein the first information comprises the at least one TID, an initiator sub-field, and an MLD address, wherein the MLD address corresponds to the at least one TID, and wherein the MLD address is identified according to a value of the initiator subfield.

2. The multi-link communication method according to claim 1, wherein the MLD address identifies either an address of the originator device initiating the session, or an address of the recipient device responding to the session.

3. A multi-link communication method, performed by a recipient device responding to a session, wherein the recipient device is an access point (AP) multi-link device (MLD) or a non-AP station (STA) MLD, comprising:

receiving a first message frame in any link of a plurality of links from an originator device initiating the session, wherein the originator device is: the AP MLD when the recipient device is the non-AP STA MLD; and the non-AP STA MLD when the recipient device is the AP MLD; and deleting, based on the first message frame, a setup session, wherein the first message frame is configured for the recipient device to delete a session link that has been set up and corresponds to at least one traffic identifier (TID) and comprises first information, wherein the first information comprises the at least one TID, an initiator sub-field, and an MLD address, wherein the MLD address corresponds to the at least one TID, and wherein the MLD address is identified according to a value of the initiator subfield.

4. The multi-link communication method according to claim 3, wherein the MLD address identifies either an address of the originator device initiating the session, or an address of the recipient device responding to the session.

5. A communication device comprising a memory, a processor and a computer program stored on the memory and runnable on the processor, wherein the communication device is configured as an originator device initiating a session, and wherein the originator device is an access point (AP) multi-link device (MLD) or a non-AP station (STA) MLD and the computer program, when executed by the processor, causes the originator device to implement actions comprising:

determining a first message frame in any link of a plurality of links; and transmitting the first message frame to a recipient device responding to the session, wherein the recipient device is: the AP MLD when the originator device is the non-AP STA MLD; and the non-AP STA MLD when the originator device is the AP MLD, wherein the first message frame is configured for the recipient device to delete a session link that has been set up and corresponds to at least one traffic identifier (TID) and comprises first information, wherein the first information comprises the at least one TID, an initiator sub-field, and an MLD address, wherein the MLD address corresponds to the at least one TID, and wherein the MLD address is identified according to a value of the initiator subfield.

6. The communication device according to claim 5, wherein the MLD address identifies either an address of the originator device initiating the session, or an address of the recipient device responding to the session.

* * * * *